J. ZIMMERMAN.
Rotary Cultivator.

No. 15,453.

Patented July 29, 1856.

UNITED STATES PATENT OFFICE.

JACOB ZIMERMAN, OF OSWEGO, ILLINOIS.

IMPROVEMENT IN CULTIVATORS.

Specification forming part of Letters Patent No. 15,453, dated July 29, 1856.

*To all whom it may concern:*

Be it known that I, JACOB ZIMERMAN, of Oswego, in the county of Kendall and State of Illinois, have invented a new and useful Improvement in Cultivators; and I do hereby declare that the following is a full, clear, and exact description of the construction and operation of the same, reference being had to the the annexed drawings, forming a part of this specification, in which—

Figure 1:
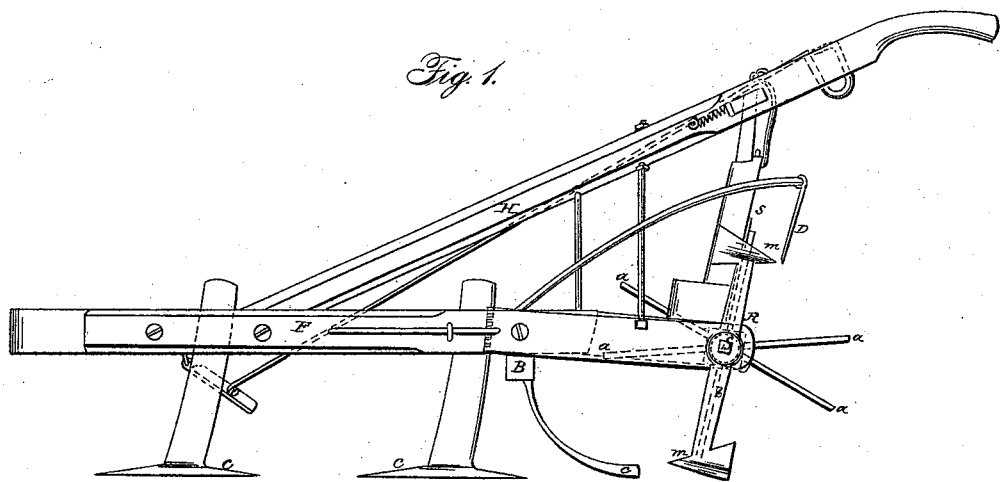
Figure 2:
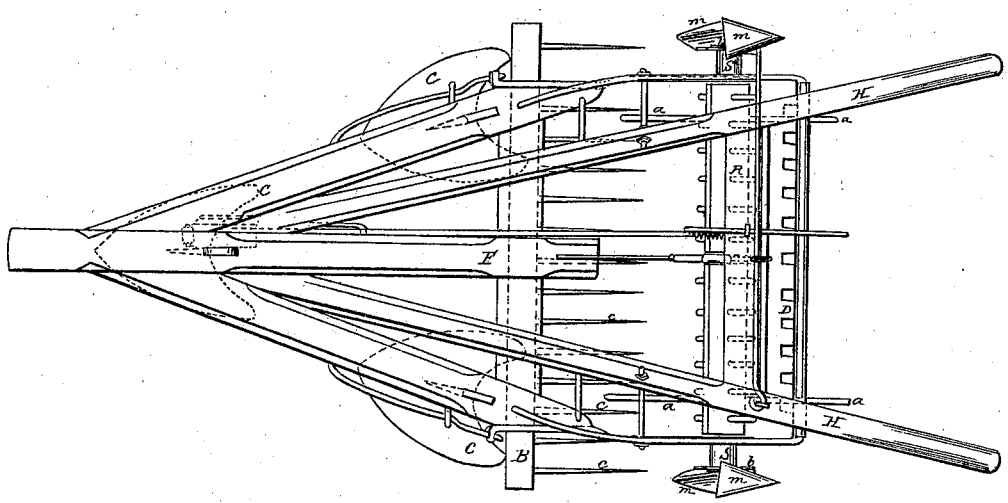

Figure 1 is a side elevation of the cultivator, and Fig. 2 is a plan of same.

Similar characters of reference in the several figures denote the same part of the cultivator.

The nature of my invention consists in the combination of a series of elastic cutters with a revolving rake and cleaner of the same arranged upon the frame of a cultivator and used in connection with the same, as and for the purposes to be set forth.

In the drawings, F is the frame, and H the handles, of the implement, whose cutters C are flat and sharp on their edges for the purpose of severing the weeds between the rows of corn. In rear of the cutters C and secured to the bar B is a series of cutters, c, constructed so as to be elastic, and running rearward, as shown in Fig. 1. In rear of the cutters c is a revolving rake, R, on the extremities of whose shaft is a bar, b, having at each end a mold-board, m, pointing in opposite directions. Behind the rake is a comb or cleaner, D, to remove the rubbish from the teeth of the rake as it revolves.

In operation the cutters c cut up the weeds and stalks as they are severed by the cutters C, and also serve to loosen the ground between the rows. The rake collects the rubbish, and when a sufficient quantity has accumulated support s is drawn up and the shaft S allowed to revolve, the arms a a aiding this revolution. As the teeth pass through the comb D all adhering rubbish is removed thereby.

The mold-boards m act upon the soil near the stalks as in ordinary cultivators when they are brought into action by the revolution of shaft S.

This cultivator is designed for use in rich and luxuriant soil where weeds grow with rapidity and a large amount of rubbish accumulates.

I claim—

The revolving rake and cleaner, in combination with the series of elastic cutters c, and flat cutters C, as set forth.

In testimony whereof I have hereunto signed my name before two subscribing witnesses.

J. ZIMERMAN.

Witnesses:
GEO. PATTEN,
JOHN S. HOLLINGSHEAD.